United States Patent [19]

Ruhs

[11] Patent Number: 4,849,198

[45] Date of Patent: Jul. 18, 1989

[54] METHOD OF REDUCING THE TENDENCY OF PARTICULATE ACTIVE OXYGEN COMPOUNDS TO CAKE

[75] Inventor: Alexander Ruhs, Rheinfelden, Fed. Rep. of Germany

[73] Assignee: Degussa Aktiengesellschaft, Frankfurt am Main, Fed. Rep. of Germany

[21] Appl. No.: 203,160

[22] Filed: Jun. 7, 1988

[30] Foreign Application Priority Data

Jun. 19, 1987 [DE] Fed. Rep. of Germany ....... 3720277

[51] Int. Cl.$^4$ ..................... C01B 31/00; C01B 15/37; C01B 15/01
[52] U.S. Cl. ................................ 423/415 P; 423/267; 423/268; 423/272; 252/186.27; 252/186.29; 252/186.43
[58] Field of Search .................... 423/415 P, 267, 268, 423/272; 252/186.25, 186.27, 186.29, 186.31, 186.32, 186.43

[56] References Cited

U.S. PATENT DOCUMENTS

| | | | |
|---|---|---|---|
| 3,234,140 | 2/1966 | Irani | 252/186.29 |
| 3,795,625 | 3/1974 | Kowalski | 252/186.29 |
| 4,179,394 | 12/1979 | Dillenburg et al. | 252/186.29 |
| 4,328,300 | 3/1983 | Gray | 252/186.31 |
| 4,428,914 | 1/1984 | Bichard et al. | 252/186.27 |
| 4,430,243 | 2/1984 | Brass | 252/186.33 |
| 4,496,472 | 1/1985 | Schafer et al. | 252/186.29 |
| 4,510,068 | 4/1985 | Rohifs | 252/186.29 |
| 4,526,698 | 7/1985 | Kuroda et al. | 252/186.3 |
| 4,614,646 | 9/1986 | Cristiansen | 252/186.29 |
| 4,681,695 | 7/1987 | Divo | 252/186.25 |

FOREIGN PATENT DOCUMENTS

| | | | |
|---|---|---|---|
| 3545909 | 6/1987 | Fed. Rep. of Germany | 252/186.29 |
| 62-185797 | 8/1987 | Japan | 252/186.29 |

*Primary Examiner*—Gary P. Straub
*Attorney, Agent, or Firm*—Cushman, Darby & Cushman

[57] ABSTRACT

Particulate, active-oxygen compounds, especially sodium percarbonate, tend to cake during storage, which makes it more difficult to handle them. The invention reduces this caking tendency while the active-oxygen content remains essentially unchanged. The method of achieving this comprises bringing the active-oxygen compound in contact with such an amount of an aqueous solution containing one or more phosphonic acid compounds capable of chelate complex formation that the weight ratio of active-oxygen compound to phosphonic acid compound is 100:0.1 to 100:10, preferably 100:1 to 100:3, and subsequent drying.

Sodium percarbonate is used in particular as active-oxygen compound and 1-hydroxyethane-1,1-diphosphonic acid as a 3 to 30% by weight aqueous solution is used as phosphonic acid compound. Sodium percarbonate wet salt is preferably washed with this solution, freed of excess solution and dried. Percarbonate treated in this manner hardly tends to cake at all and exhibits a greater active-oxygen stability.

11 Claims, No Drawings

METHOD OF REDUCING THE TENDENCY OF PARTICULATE ACTIVE OXYGEN COMPOUNDS TO CAKE

The invention relates to a method for reducing the tendency of particulate, active-oxygen compounds, especially sodium percarbonate, to cake.

BACKGROUND OF THE INVENTION

Active-oxygen compounds such as e.g. - compounds which split off (inorganic or organic) hydrogen peroxide or inorganic or organic peracids are used as bleaching agents, especially in detergents, bleaching and cleaning agents. It is however known that some active-oxygen compounds tend to cake if stored for a fairly long time. The product, stored in sacks, containers or silos, forms clumps and hardens in such instances, which makes it harder or even impossible to handle, e.g. to transport or measure.

As is known, sodium percarbonate exhibits a particularly strong tendency to clump and cake. When selecting an active-oxygen compound for an application, this property is considered, along with its active-oxygen stability, which is less than that of sodium perborate hydrates. For this reason, sodium percarbonate is less widely used as bleaching component. While many methods have been suggested for stabilizing sodium percarbonate, it has not yet been possible to solve the problem of caking in a satisfactory manner. Even sodium percarbonate, prepared and stabilized according to various methods, exhibits a more or less strong tendency to cake.

Published German Patent Specification DE-OS No. 27 00 797 (corresponding to U.S. Pat. No. 4,179,394) teaches a method of improving the storage life, especially the silo storage life, of oxygen-releasing compounds such as e.g. sodium percarbonate. The method consists of granulating the oxygen-releasing compound in the presence of water together with sodium tripolyphosphate and/or sodium pyrophosphate, optionally with the addition of other detergent builders and auxiliary granulating agents which have a stabilizing action on active-oxygen such as e.g. water glass, magnesium phosphate or hexametaphosphate. Then, the granulates, which have formed, are dried. The oxygen-releasing compound and the phosphate are granulated in a weight ratio of 1:0.1 to 1:1, preferably 1:0.2 to 1:0.4. Phosphonic acids are named without a more specific characterization among the detergent components which can be usefully worked into the granulates. There are no suggestions as to which phosphonic acids are intended, in what amount they are to be added and what effect they have.

One disadvantage of this known method is the relatively expensive granulating method, which follows the actual preparation of the active-oxygen compound as a completely separate method step. In addition, the granulates produced in this manner exhibit a lower effective active-oxygen content and may contain components which interfere with use in a broad range of formulations. The manufacturer of active-oxygen compounds therefore attempts to minimize the use of auxiliary agents and to minimize their concentration as much as possible in order to obtain essential properties such as a low tendency to cake.

It is known that phosphonic acid compounds capable of chelate complex formation with heavy metals which break down active-oxygen compounds are used for stabilizing active-oxygen compounds during their preparation or formulation to detergents and cleaning agents. Thus, published German Patent Specification DE-OS No. 26 22 458 (corresponding to U.S. Pat. No. 4,117,087) teaches the use of hydrogen peroxide containing 1-hydroxyethane-1,1-diphosphonic acid for preparing sodium percarbonate in a wet method. However, a percarbonate which greatly caked was obtained in the reworking of this method. Even an addition of the phosphonic acid cited above to the soda additive solution of the (sodium percarbonate) method of preparation - according to the disclosure of German Patent DE-PS No. 28 00 760 (corresponding to British Patent 2,011,874) did not result in any appreciable reduction of the caking tendency. None of the known methods are concerned with the use of such phosphonic acid compounds for reducing caking, nor are these compounds brought in contact as an aqueous solution with the previously-formed active-oxygen compounds as in the present invention as described below.

SUMMARY OF THE INVENTION

The object of the present invention is to provide a method for reducing the tendency to cake of particulate active-oxygen compounds which can be combined easily with one of the known methods of preparing the active-oxygen compounds and which can be performed without appreciable additional expense for equipment, in a reliable and simple manner.

Another object of the invention is to provide such a method which minimizes the amount of auxiliary agents used for obtaining the reduced caking and which minimizes the reduction of the active-oxygen content.

These and other objects are achieved by bringing particulate active-oxygen compounds in contact with an aqueous solution containing a phosphonic acid compound and drying the treated, particulate product. More specifically, the active-oxygen compound is brought in contact with an aqueous solution containing one or more phosphonic acid compounds capable of chelate complex formation in such amount that the weight ratio of the active-oxygen compound to the phosphonic acid compound is 100:0.1 to 100:10.

The following test is used to evaluate the tendency of the product to cake. Approximately 700 g of the product to be tested is introduced into a 100 ml glass vessel which is equipped with a ground-glass stopper; after having been stored for one week at room temperature (approximately 22° C.) in the closed glass, the glass is tipped and the flow behavior evaluated on a scale of 1–10, in which the ratings have the following significance:

10: Flows freely like dry sand

9: Flows with delay and hesitation. Slight agitation brings about trickling, small clumps may remain 7: A vigorous blow causes a breakdown into small clumps 6: Several blows are necessary 5: Many blows are necessary, but clumps still remain 4: Clumps can not be broken down by agitation 3: The remaining clumps can be easily comminuted by finger pressure 2: Hard clumps remain which can only be broken down with force 1: Product is caked hard.

It was determined in the testing of the caking tendency of sodium percarbonate that the caking tendency of sodium percarbonate prepared in the so-called wet method is generally great and is also subject to considerable variations. In the so-called wet method, aqueous hydrogen peroxide solution is reacted with sodium carbonate dissolved or suspended in water and sodium percarbonate is crystallized from the aqueous phase. The caking tendency has the following effect in production: After about 2 to 24 hours following preparation of the sodium percarbonate, it hardens in the sack or in the silo. Surprisingly, a changing of the grain spectrum in the direction of a coarser and more unified grain as well as the use of auxiliary flow agents such as hydrophilic and hydrophobic pyrogenic silicic acids or magnesium carbonate do not result in any appreciable reduction of the caking tendency.

It was found that the caking tendency of sodium percarbonate can be distinctly reduced if the surface composition of the crystals or agglomerates is purposefully changed:

If sodium percarbonate wet salt prepared by the wet method or sodium percarbonate dry salt obtained according to another method of preparation, e.g. by means of reacting aqueous hydrogen peroxide with an aqueous soda solution in a fluid-bed drier, is washed on a laboratory filter with an aqueous solution containing, preferably, 15% by weight 1-hydroxyethane-1,1-diphosphonic acid and subsequently dried at approximately 50° C. in a drying oven, completely free-flowing products are obtained which exhibit an evaluation number of 10 in the caking test after one week. A certain reduction of the caking tendency can also be obtained by washing with water but not by washing with diluted phosphoric acid. However, in order to achieve an appreciable effect by washing with water alone, a large amount of water is required, which can not be tolerated on an industrial scale because of the reduction in yield associated therewith as well as because of the increase of the amount of caustic solution. It is possible, on the other hand, to achieve the desired reduction of the caking tendency even with a small amount of solution by using an aqueous solution of selected phosphonic acids.

Percarbonates with a sharply reduced caking tendency can also be produced by spraying an aqueous solution of the phosphonic acids selected in accordance with the present invention onto percarbonate dry or wet salt and by a subsequent drying.

On an industrial scale, it is also possible to reduce the tendency to cake by two to four evaluation stages by bringing percarbonate in contact with an aqeuous solution containing one or more phosphonic acid compounds capable of chelate complex formation. Such a solution is preferably used as wash solution, e.g. in a solid-liquid separating device such as a centrifuge; after drying, a flowable percarbonate with a very low caking tendency is obtained. However, the aqueous solution of the phosphonic acid compound can also be sprayed onto the percarbonate and dried at the same time or subsequently; a particularly suitable device for this is a fluid-bed drier.

It is assumed that when the particulate active-oxygen compound is brought in contact with the aqueous solution of one of more phosphonic acid compounds, this changes the surface composition of the particles. Thus, impurities and/or other constituents which adhere to the surface of the particles of the active-oxygen compound, which can be crystals or agglomerates of solid, generally-crystalline particles, are responsible for the strong caking tendency. In some cases, they may also be responsible for the reduced active-oxygen stability. They can be partially removed in the embodiment involving washing in a solid-liquid separating device and/or are rendered harmless by the phosphonic acid compound. The phosphonic acid compound is adsorbed on the surface of the crystals, which reduces the caking tendency and at the same time the active-oxygen stability is increased. the adsorbed amount is generally slight, as a result of which the active-oxygen content is not lowered significantly. As a result of the omission of the washing step, the embodiment involving spraying and drying generally brings about a somewhat lesser effect.

The method of the invention is useful with particulate active-oxygen compounds. They can be inorganic, e.g. per-salts such as percarbonates and perborates or salts of peroxyacids such as persulfates. Even organic active-oxygen compounds, e.g. solid peroxycarboxylic acids or hydrogen peroxide addition compounds such as percarbamide can be used with advantage in the method of the invention. The method can be used in an especially advantageous manner for those active-oxygen compounds which are prepared in aqueous phase and exhibit a relatively high water solubility —in these instances the washing of the crystals with an effective amount of water for removing adhering mother liquor and/or impurities and reducing the caking tendency frequently causes problems on account of the yield loss associated therewith. The method of the invention is therefore quite particularly suited for percarbonates such as sodium percarbonate of the formula $2Na_2CO_3 \cdot 3H_2O_2$, especially sodium percarbonate prepared by the wet method.

Phosphonic acids and/or their alkali, alkaline earth or ammonium salts are used with preference as a phosphonic acid compound capable of chelate complex formation which is brought in contact with the active-oxygen compound individually or in a mixture of several in the aqueous solution. The phosphonic acids are preferred. Of course, when an active-oxygen compound with an alkaline action such as e.g. sodium percarbonate is brought in contact with a phosphonic acid, the latter is converted entirely or partially into a salt and can be found as such salt on the surface of the active-oxygen compound. The concentration of the phosphonic acid compound in the aqueous solution is generally 0.5 to 60% by weight, preferably 5 to 30% by weight.

It is possible that the aqueous solution containing one or more phosphonic acid compounds also contains other substances for optimizing the properties of the active-oxygen compound such as other stabilizers, e.g. magnesium salts, water glass, complex-forming amino carboxylic acids, pyridine carboxylic acids and phosphane oxides with preferably $C_6$ to $C_{12}$ alkyl groups. Water-soluble compounds such as sodium sulfate, sodium carbonates, sodium silicates, sodium phosphates and boric acid compounds which can be used to encase active-oxygen compounds can also be present.

The weight ratio of the active-oxygen compound to the phosphonic acid compound(s) dissolved in the aqueous solution is 100 to 0.1 to 100 to 10, preferably a ratio of 100:0.5 to 100:5 and quite preferably 100:1 to 100:3. The optimum effective amount can be determined by an expert using a simple test. He should adapt this test to the method provided by him in practice, e.g. washing in a centrifuge or spraying into a fluid bed. The ratio is a function of the degree of purity and the caking tendency of the active oxygen compound and of the effectiveness of the phosphonic acid compound.

Preferably, one or more diphosphonic acid compounds of the following general formula I are used as the phosphonic acid compound

in which formula R=hydrogen, methyl or ethyl, X=hydrogen, an alkali cation, alkaline earth cation or ammonium cation and Q=hydrogen, an OH— or $NY_2$-group where Y=H, $CH_2COOX$ or $CH_2PO_3X_2$. Compounds with Q equal to OH and R equal to methyl are preferred. 1-hydroxyethane-1,1-diphosphonic acid, which is usually offered on the market as a 50 to 60% by weight aqueous solution, is especially advantageous.

Phosphonic acid compounds of the following general formula (II) can also be used in the method of the invention. Such phosphonic acid compounds have also been described as stabilizers for active-oxygen compounds.

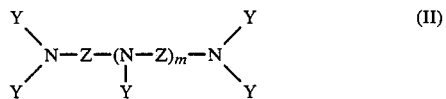

In formula (II), Y signifies the group $CH_2PO_3X_2$, Z signifies an alkylene group which contains 2 to 6 carbon atoms, preferably ethylene, 1,2-propylene and 1,3-propylene or 2-hydroxy-1,3-propylene, m represents a whole number from 0 to 4, preferably 0 or 1 and X stands for hydrogen, an alkali cation or alkaline earth cation or ammonium cation; one or two Y groups can be $Ch_2COOX$ or $CH_2CH_2OH$; phosphonic acid compounds with X=H are preferred. Compounds of the type ethylenediaminetetra (methylene phosphonic acid) and diethylenethiaminepenta (methylene phosphonic acid) are particularly suitable.

Nitrilotris (methylene phosphonic acid) as well as its alkali, alkaline earth and ammonium salts can be used.

As has already been stated, it is particularly advantageous to bring the particulate active-oxygen compound, preferably following its preparation in aqueous phase, in contact with the aqueous solution containing one or more phosphonic acid compounds by washing and to dry the moist product freed of excess solution by centrifuging or filtering. The effect is especially good and the method quite simple to manage if the wet active-oxygen compound, such as e.g. sodium percarbonate prepared with the wet method, is washed in a centrifuge with the solution containing the phosphonic acid compound. In this procedure, the solution is sprayed on and the product freed of excess solution. After this treatment, the product is dried at temperatures below that at which there is a noticeable breakdown of the active-oxygen compound and below the melting point. In general, active-oxygen compounds are dried at 30° to 95° C., preferably in a fluidized bed and/or under reduced pressure. Sodium percarbonate is preferably dried at approximately 50° C. in a fluidized bed.

For sodium percarbonate, a 3-30% by weight, especially 10 - 20% by weight, aqueous solution of 1-hydroxyethane-1,1-diphosphonic acid is used for making contact, using a weight ratio of sodium percarbonate to 1-hydroxyethane-1,1-diphosphonic acid of 100 : 0.5 to 100 : 3.

The reduced caking tendency of the active-oxygen compound made possible by the method of the invention has a very favorable effect: Cakings on the walls of the sacking bin no longer occur; in the case of storage in a sack, no or only slight hardening occurs, even after several weeks of storage. The latter can be eliminated by the mechanical loading which occurs during customary handling and hardly has a disturbing effect. Moreover, the method of the invention permits a reduction of the caking tendency without reducing the active-oxygen content; the latter may even be slightly increased, depending on the method. Another positive side effect of the method is the improvement of the active-oxygen stability during moist, warm storage and in particular in the presence of heavy metals. The products prepared in accordance with the invention can be used as bleaching components in detergents, bleaching and cleaning agents, in which they are distinguished by their good storage life and low caking tendency.

The following examples illustrate the method of the invention and the advantages which can be achieved with it:

EXAMPLE 1

Reference Example

Sodium percarbonate was prepared according to Example 1 of DE-OS No. 26 22 458 (corresponding to U.S. Pat. No. 4,117,087). A solution of hydrogen peroxide containing 2 g/l 1-hydroxyethane-1,1-diphosphonic acid was continuously added, with agitation and cooling, into a sodium carbonate suspension which also contained sodium percarbonate, water glass, sodium hexametaphosphate and common salt. After crystallization, stabilization, separation and drying, a sodium percarbonate was obtained which exhibited an evaluation number of 6 in the caking test after one week of storage, that is, it exhibited a strong caking tendency.

EXAMPLE 2

Sodium percarbonate, prepared on an industrial scale under the conditions of DE-PS No. 28 00 760 (corresponding to British Pat. No. 2,011,874) - wet method.

The wet salt was treated in the method of the invention with an aqueous solution of 1-hydroxyethane-1,1-diphosphonic acid: The solution was sprayed in a centrifuge onto the wet salt and excess solution was centrifuged off. The material was subsequently dried in a fluid bed drier at approximately 50° C.

The table shows the concentration of the phosphonic acid solutions added as well as the weight ratio of sodium percarbonate wet salt (moisture content 7-10% by weight in relation to the wet salt) to phosphonic acid added, and, in addition, the results of the caking test and of the climate test. The sodium percarbonate added had an active-oxygen content of approximately 14.0% in relation to dry salt; the active-oxygen content changed practically not at all as a result of the treatment in accordance with the invention.

TABLE

| concentration of phosphonic acid | weight ratio sodium percarbonate: phosphonic acid | evaluation number in the caking test (after 1 week) | active-oxygen loss (%) after 10 days at 30° C. and 92.9% rel. moisture |
|---|---|---|---|
|  | untreated | 6 | 25-30 |

| concentration of phosphonic acid | weight ratio sodium percarbonate: phosphonic acid | evaluation number in the caking test (after 1 week) | active-oxygen loss (%) after 10 days at 30° C. and 92.9% rel. moisture |
|---|---|---|---|
| 7.5 | 100:0.75 | 8 | |
| 7.5 | 100:1.5 | 8–9 | |
| 15 | 100:1.5 | 9 | 12–15 |
| 15 | 100:2.25 | 9 (−8) | |
| 15 | 100:3.0 | 9–8 | |
| 30 | 100:3.0 | 8 | |

Note: The results in the caking test and the climate test indicate the spread from three tests in each instance.

What is claimed is:

1. A method for reducing the tendency of particulate sodium percarbonate of the formula $2Na_2CO_3 \cdot 3H_2O_2$ to cake, said method comprising:

(a) washing wet particulate sodium percarbonate following its preparation in aqueous phase with an aqueous solution containing at least one phosphonic acid compound capable of chelate complex formation, wherein the amount of said aqueous solution containing at least one phosphonic acid compound is such that the weight ratio of the sodium percarbonate to the phosphonic acid compound is 100:0.1 to 100:10, (b) filtering or centrifuging the particulate sodium percarbonate; and (c) drying.

2. A method according to claim 1 in which said at least one phosphonic acid compound is selected from the group consisting of phosphonic acids and their alkali, ammonium and alkaline earth salts.

3. A method according to claim 2 in which said at least one phosphonic acid compound is a phosphonic acid.

4. A method according to claim 2 in which said at least one phosphonic acid compound has the general formula (I)

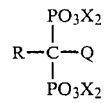

in which formula R=H, CH$_3$ or C$_2$H$_5$; X=H, an alkali cation, alkaline earth cation or ammonium cation; Q=H, OH or NY$_2$ where Y=H, CH$_2$CO$_2$X or CH$_2$PO$_3$X$_2$.

5. A method as set forth in claim 4 in which Q=OH and R=CH$_3$.

6. A method as set forth in claim 5 in which said phosphonic acid compound is in the form of the free acid.

7. A method according to claim 2 in which said at least one phosphonic acid compound has the general formula (II)

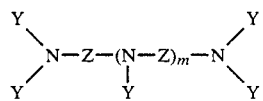

in which formula Y signifies the group CH$_2$PO$_3$X$_2$, Z is an alkylene group with 2 to 6 carbon atoms, m is a whole number from 0 to 4 and X is hydrogen, an alkali cation, alkaline earth cation or ammonium cation and one or two Y groups can also be CH$_2$COOX or CH$_2$—CH$_2$OH.

8. A method as set forth in claim 7 in which Z is ethylene, 1,2- or 1,3-propylene or 2-hydroxy-1,3-propylene and m is 0 or 1.

9. A method according to claim 8 in which sodium percarbonate is washed with an aqueous solution containing 3 to 30% by weight 1-hydroxyethane-1,1-diphosphonic acid in such an amount that the weight ratio of sodium percarbonate to 1-hydroxyethane-1,1-diphosphonic acid is 100:0.5 to 100:3.

10. A method according to claim 1 in which the active-oxygen compound is washed with an aqueous solution containing 0.5 to 60% by weight of said at least one phosphonic acid compound.

11. A method according to claim 10 in which an aqueous solution containing 5 to 30% by weight of said at least one phosphonic acid compound is used.

* * * * *